UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK.

THIO-UREA COMPOUND AND PROCESS OF MAKING SAME.

SPECIFICATION forming part of Letters Patent No. 653,678, dated July 17, 1900.

Application filed April 2, 1900. Serial No. 11,240. (No specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Thio-Urea Compounds; and we hereby declare the following to be a clear and exact description of our invention.

Our invention relates to the production of a new thio-urea derivative of amidonaphthol sulfonic acid, being an alkaline salt of an acid having the following formula:

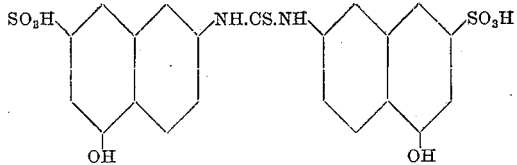

The process for producing this body consists in heating beta$_1$-amido-alpha$_3$-naphthol-beta$_4$-sulfonic acid with carbon bisulfid (CS$_2$) and sulfur in a neutral or alkaline solution. A condensation of two molecules of the above-named amidonaphthol sulfonic acid with one molecule of carbon bisulfid takes place under evolution of one molecule of sulfureted hydrogen, the above-defined thio-urea derivative being thus formed according to the following equation:

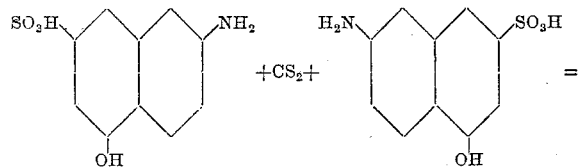

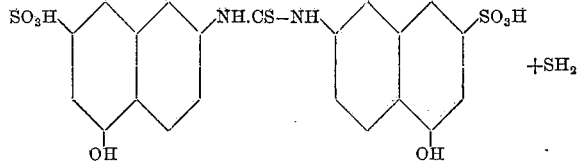

The new thio-urea derivative thus obtained may be employed for the manufacture of valuable azo dyestuffs.

In carrying out our new process practically we can proceed as follows, (the parts being by weight:) To a solution of 23.9 parts of beta$_1$-amido-alpha$_3$-naphthol-beta$_4$-sulfonic acid in about from two hundred to three hundred parts of water, to which so much sodium carbonate has been added as to render it slightly alkaline, we add two hundred to three hundred parts of ethylic alcohol, from twenty to twenty-five parts of carbon bisulfid, and from 0.4 to 0.5 parts of powdered sulfur. The mixture thus obtained is boiled in a vessel provided with a reflux condenser until the evolution of sulfureted hydrogen ceases. After the alcohol and the superfluous carbon bisulfid have been distilled off the reaction mixture is filtered in order to remove the sulfur which has been precipitated. The filtrate is then acidulated by means of hydrochloric acid and the thio-urea derivative is precipitated from the acid solution by the addition of common salt. For further purification it is extracted with water, filtered, and then precipitated again by the addition of common salt. The pure sodium salt of the new body thus obtained crystallizes from water containing common salt in the shape of white leaves, which are readily soluble in cold and very readily in hot water, and soluble with difficulty in alcohol. The barium salt represents white leaves, which are difficultly soluble in cold and readily soluble in hot water. The calcium salt forms mother-of-pearl-like shining leaves, which are very readily soluble in hot and less soluble in cold water. These salts are prepared by the addition of solutions of barium chlorid ($BaCl_2$) or of calcium chlorid ($CaCl_2$) to watery solutions of the sodium salt of the said thio-urea derivative. On boiling the thio-urea derivative with the twenty-fold quantity of hydrochloric acid of twenty per cent. it dissolves and after boiling for some time, $beta_1$-amido-$alpha_3$-naphthol-$beta_4$-sulfonic acid is regenerated and precipitates from the liquid.

The new thio-urea derivative is capable of combining with one and likewise with two molecules of diazo compounds, thus furnishing valuable azo dyestuffs.

Having now described our invention and in what manner the same is to be performed, what we claim as new, and desire to secure by Letters Patent, is—

1. The process for producing a new thio-urea derivative of amidonaphthol sulfonic acid by first dissolving a mixture of $beta_1$-amido-$alpha_3$-naphthol-$beta_4$-sulfonic acid and sodium carbonate in water, secondly heating the solution thus obtained with carbon bisulfid, sulfur and alcohol and finally isolating the resulting thio-urea derivative, substantially as hereinbefore described.

2. As a new article of manufacture the thio-urea derivative of $beta_1$-amido-$alpha_3$-naphthol-$beta_4$-sulfonic acid which in the form of the free acid has the following formula:

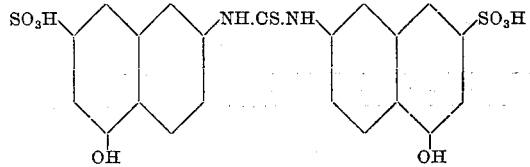

and in the form of the sodium salt consists of white leaves being capable of combining with one and likewise with two molecules of diazo compounds, being readily soluble in cold, very readily soluble in hot water, and which on boiling with the twenty-fold quantity of hydrochloric acid of twenty per cent. dissolves and after some time $beta_1$-amido-$alpha_3$-naphthol-$beta_4$-sulfonic acid is regenerated and precipitates, substantially as hereinbefore described.

In testimony whereof we have signed our names in the presence of two subscribing witnesses.

ADOLF ISRAEL.
RICHARD KOTHE.

Witnesses:
OTTO KÖNIG,
HANS SCHADDY.